J. Haw,
Circular Saw Mill.
No 244. A.I. Patented July 26, 1859.
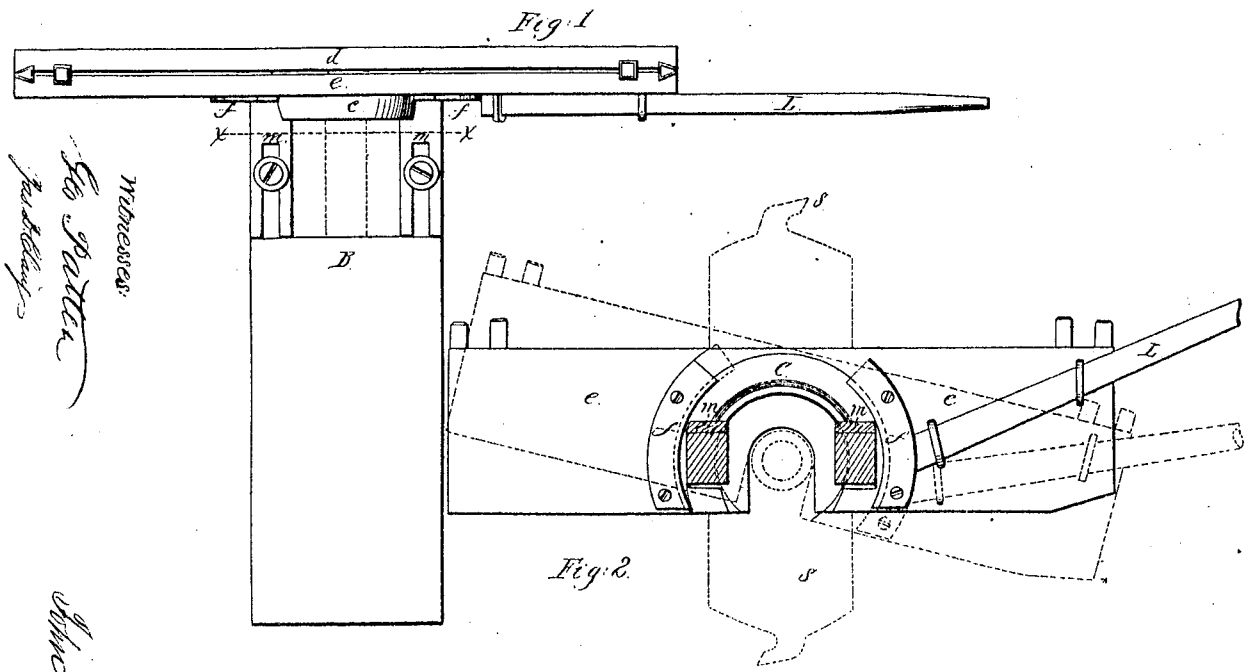
Witnesses:
Geo Patten
Jas D. Clay
Inventor:
John Haw
AM. PHOTO-LITHO. CO. N.Y. (OSBORNE'S PROCESS)

UNITED STATES PATENT OFFICE.

JOHN HAW, OF OLD CHURCH, VIRGINIA.

IMPROVEMENT IN PICKER SAWING-MACHINES.

Specification of Additional Improvement No. 244, dated July 26, 1859, forming a part of Letters Patent No. 17,626, dated June 23, 1857.

*To all whom it may concern:*

Be it known that I, JOHN HAW, of Old Church, in the county of Hanover and State of Virginia, have invented a new and useful Improvement in Saw-Mills, in addition to my patent dated 23d day of June, 1857; and I do hereby declare that the following is a full, clear, and exact description of the construction and operation of the same, reference being had to the annexed drawings, forming part of this specification, in which—

Figure 1 is a top view of my improvement. Fig. 2 is a vertical section on line *x x*, showing the saw in red ink.

Similar characters in the several figures denote the same parts.

In the original patent of my picker-mill the guides are stationary. This is disadvantageous when sawing small logs, as the teeth have considerable space to move through after leaving the guides. To obviate this I so attach the saw-guides to their bearing that they shall have a movement about the axis of the saw-shaft so as to adjust them to logs of different sizes, the details of construction being as follows:

In the drawings, S is the saw between the guides *d* and *e*, which are connected with their bearing B by the slotted braces *m m*, to which is attached a circular plate *c*, moving under guide-plates *f f*, so as to allow the guides *d* and *e* to move nearer the log. L is the lever by which the guides are turned, so that in sawing small logs by turning the lever L the guides *d* and *e* are, by means of the movement given by the circular plate *c*, running under the guide-plates *f f*, brought nearer to the log, as seen by the position in red ink in Fig. 2, and the space which the saw has to move through after leaving the guides is thus diminished.

I claim—

Attaching the saw-guides to the overhanging bearing, so as to adjust them to the sawing of small logs, substantially as set forth.

In testimony whereof I have hereunto signed my name before two subscribing witnesses.

JOHN HAW.

Witnesses:
GEO. PATTEN,
F. S. MYER.